United States Patent [19]
Porter et al.

[11] Patent Number: 5,740,161
[45] Date of Patent: Apr. 14, 1998

[54] METHOD AND APPARATUS FOR SYNCHRONIZING VIEWED INFORMATION IN A CONFERENCING ENVIRONMENT

[75] Inventors: Daniel R. Porter, Beaverton; David L. Anderson; Anthony C. Salvador, both of Portland; Rune A. Skarbo; Terry A. Alexander, both of Hillsboro, all of Oreg.

[73] Assignee: Intel Corporation, Santa Clara, Calif.

[21] Appl. No.: 555,492

[22] Filed: Nov. 8, 1995

[51] Int. Cl.$^6$ .................................................. H04L 12/18
[52] U.S. Cl. ................................................ 370/260; 348/15
[58] Field of Search ............................. 370/94.1, 94.2, 370/94.3, 60, 60.1, 61, 62, 105.1, 259, 260, 261, 266, 270, 241, 350, 503, 514, 511; 379/202; 455/54.2, 16, 5.1, 414, 416, 502; 375/211, 356; 348/15, 16, 19, 20

[56] References Cited

U.S. PATENT DOCUMENTS

| | | | |
|---|---|---|---|
| 4,449,248 | 5/1984 | Leslie et al. | 455/38.3 |
| 5,107,443 | 4/1992 | Smith et al. | 395/158 |
| 5,473,363 | 12/1995 | Ng et al. | 370/62 |
| 5,548,591 | 8/1996 | Horikoshi | 370/62 |

OTHER PUBLICATIONS

"Picture Tel introduces new Windows 95—based desktop videoconferencing product: New standards–based PCS 200 jointly developed with Compaq", Picture Tel Corporation News Release, 16 Oct., 1995, pp. 1—4.

*Primary Examiner*—Dang Ton
*Attorney, Agent, or Firm*—Blakely, Sokoloff, Taylor & Zafman

[57] ABSTRACT

A method and apparatus for synchronizing viewed information between a first endpoint and a second endpoint of a conferencing environment so that the first and second endpoints display the same location of the viewed information includes one of the endpoints receiving a request to synchronize the viewed information. An identifier of the location to which the document is to be synchronized is also received. The viewed information at the endpoint is then updated to display the identified location. In one embodiment, the first endpoint receives the request to synchronize the viewed information and sends a view synchronization message to the second endpoint. The view synchronization message includes a page identifier corresponding to the identified location and a center point which identifies a location within the page corresponding to the page identifier. Upon receipt of the view synchronization message, the viewed information at the second endpoint is updated to display the identified location.

17 Claims, 6 Drawing Sheets

METHOD AND APPARATUS FOR SYNCHRONIZING VIEWED INFORMATION IN A CONFERENCING ENVIRONMENT

BACKGROUND OF THE INVENTION

1. Field of the Invention

The present invention pertains to the field of data and video conferencing. More particularly, this invention relates to synchronizing the viewing of information in a data and/or video conference.

2. Background

Computer technology is continuously advancing, resulting in modern computer systems which provide ever-increasing performance. One result of this improved performance is an increased use of computer systems by individuals in a wide variety of business, academic and personal applications. One such use is that of data and/or video conferencing, where users of multiple computer systems in different locations communicate with each other. Typically, data conferencing refers to individuals viewing documents, data, or similar information, and video conferencing refers to individuals viewing images (generally of one another). The different locations can span virtually any distance, such as between multiple offices in the same building or between multiple offices in different countries.

The benefits of data and/or video conferencing are numerous. Among these benefits is the ability of multiple individuals to effectively and quickly communicate information and ideas to one another over large distances. The information and ideas can be displayed by each computer system, and frequently verbal discussions can accompany the images. Data and video can both be transmitted in a conferencing environment.

However, one problem which exists in data conferencing is enabling multiple individuals to view the same information. For example, a 50-page document may be shared in a data conference and each of the multiple users may be viewing a different one of the 50 pages. In certain situations, it would be advantageous to be able to synchronize each of the multiple users to the same location in the 50-page document, thereby ensuring that each individual user has the same portion displayed. Thus, it would be beneficial to provide a mechanism which allows multiple users to be synchronized to the same location of viewed information in a data conference.

Additionally, a significant amount of bandwidth in the connection(s) between conferencing systems is typically used in order to provide video and/or data conferencing services. Thus, it would be beneficial to provide a mechanism which allows individual users of a data conference to be synchronized to view the same information, yet uses a small amount of bandwidth.

Furthermore, each display device being used in a video and/or data conference can have a different display resolution, and the video and/or data information can be displayed in a different window size on each display device. Thus, it would be beneficial to provide a mechanism which allows individual users of a data conference to be synchronized to view the same information regardless of the type of display, resolution of the display, or window size being used for the data conference on the display device.

The present invention provides for these and other advantageous results.

SUMMARY OF THE INVENTION

A method and apparatus for synchronizing viewed information in a conferencing environment is described herein. Viewed information is synchronized between multiple endpoints of a conferencing environment so that the multiple endpoints display the same location of the viewed information. The method includes one of the endpoints receiving a request to synchronize the viewed information. An identifier of the location to which the document is to be synchronized is also received. The viewed information at the endpoint is then updated to display the identified location.

In one embodiment, a first endpoint receives the request to synchronize the viewed information and sends a view synchronization message to one or more second endpoints. The view synchronization message includes a page identifier corresponding to the identified location and a center point which identifies a location within the page corresponding to the page identifier. Upon receipt of the view synchronization message, the viewed information at the second endpoint(s) is updated to display the identified location.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention.

Figure 1:
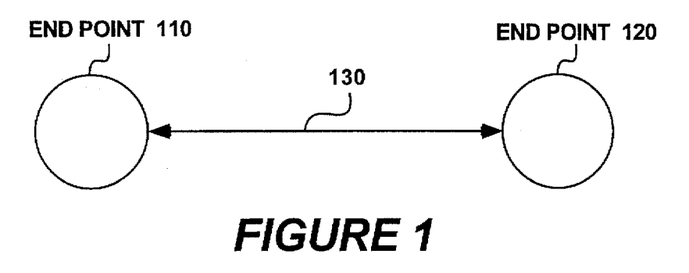
FIG. 1 shows a conferencing environment according to one embodiment of the present invention.

FIG. 1 shows a conferencing environment according to one embodiment of the present invention. Conferencing environment 100 includes two end points 110 and 120 coupled together by a communication link 130. In one implementation, each of the end points 110 and 120 are general personal computer systems. Alternatively, end points 110 and 120 could be dedicated conferencing systems.

Communication link 130 represents any of a wide variety of conventional communication media. For example, communication link 130 can be an Integrated Services Digital Network (ISDN) or Plain Old Telephone Service (POTS) line, Ethernet cable, a fiber optic line, etc. Additionally, communication link 130 can be a wireless communication medium, such as signals propagating in the infrared or radio frequencies. Furthermore, communication link 130 can be a combination of communication media and can include converting devices for changing the form of the signal based on the communication media being used.

Figure 2:
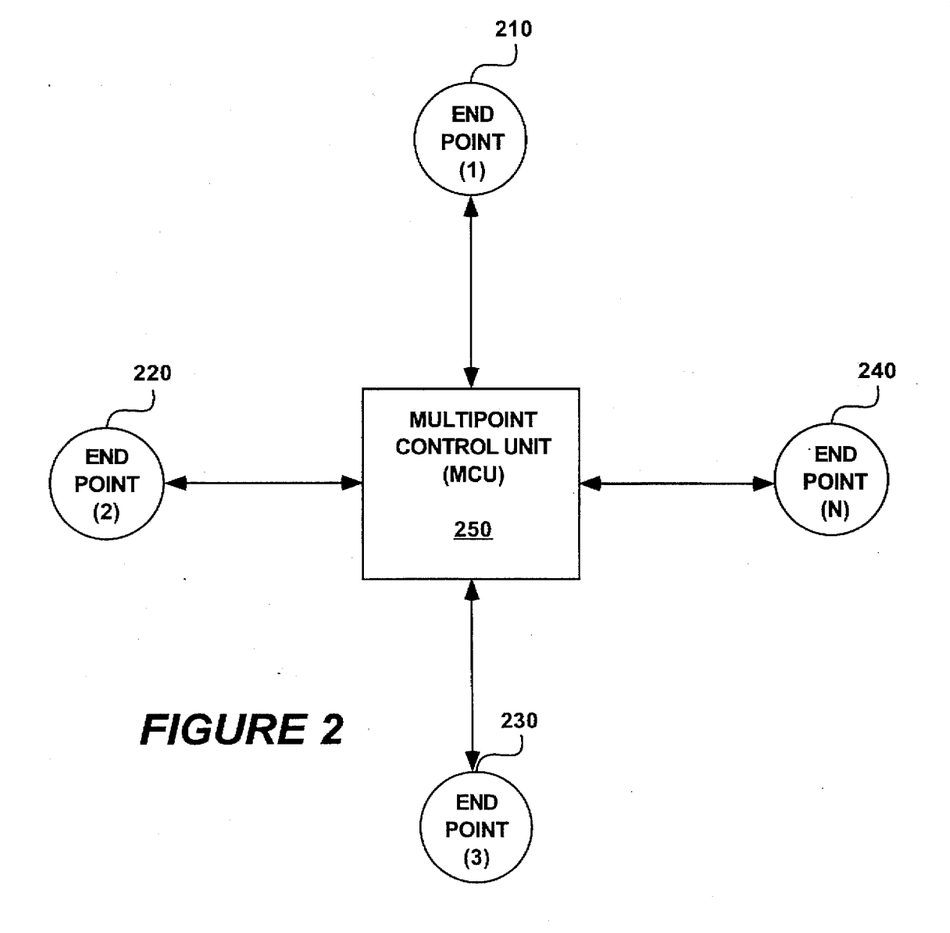
FIG. 2 shows a conferencing environment according to another embodiment of the present invention.

FIG. 2 shows a conferencing environment according to another embodiment of the present invention. Conferencing environment 200 includes multiple (N) end points: end point 210, end point 220, end point 230, and end point 240. Each of the end points 210–240 are coupled together via a multipoint control unit (MCU) 250. MCU 250 is a switching device which transfers inputs received from each end point to the other end points. MCU 250 is coupled to each end point via a communication link, as shown in FIG. 2. Each communication link can be any of a wide variety of conventional communication media, analogous to communication link 130 of FIG. 1 discussed above.

Each end point 210–240 is coupled to a video camera, such as a ProShare™ conferencing video camera. The video cameras provide a visual representation of the user of the end point, thereby allowing each conference participant to see the other participants, even though they may be separated by great distances.

In one embodiment of the present invention, MCU 250 is a dedicated switching device. Alternatively, MCU 250 can be implemented in software, such as on a computer system coupled to a local area network (LAN). It is to be appreciated that any of a wide variety of conventional multipoint control units can be used with the present invention.

It should be noted that in some embodiments of the present invention MCU 250 is not necessary in multipoint conferences. In these embodiments, each end point receives all of the conferencing information and performs the switching function of MCU 250.

Applications can be shared between multiple systems in the conferencing environment by having the application execute on only a single system. This is typically referred to as "application sharing". The system which executes the application is referred to as the host system. The host system transfers the necessary information from the host system to one or more end points to allow the end point(s) to display the application and appear to the users of the end point(s) as if the application were actually executing at their end point(s).

Additionally, applications can also be shared between multiple systems in the conferencing environment where the application is executing at all of the end points. When an application is executing at multiple end points, each participant can make changes to the application data at his or her end point (subject to any turn-taking controls which may be in place). The end point then sends a message to all of the other end points indicating the changes which were made by the participant. The other end points receive these messages and provide the changes as inputs to the application they are executing. One such application that can be executed at multiple end points is the ProShare™ Notebook.

The conferencing environments which can be used with the present invention support both data conferences and audio/video conferences. A data conference is a conference where one or more documents or similar information are displayed to each participant (e.g., application sharing or the ProShare™ notebook). An audio/video conference is a conference where one or more visual images (e.g., images of conference participants) are displayed to each participant along with audio signals from the participants. The present invention also supports data and audio/video conferences concurrently, such as by displaying a conference participant, a document(s), and providing the participant's voice simultaneously. The conference data of a conference refers to the data or information being provided to the conference participants, such as a shared application information, video images or audio signals.

Figure 3:
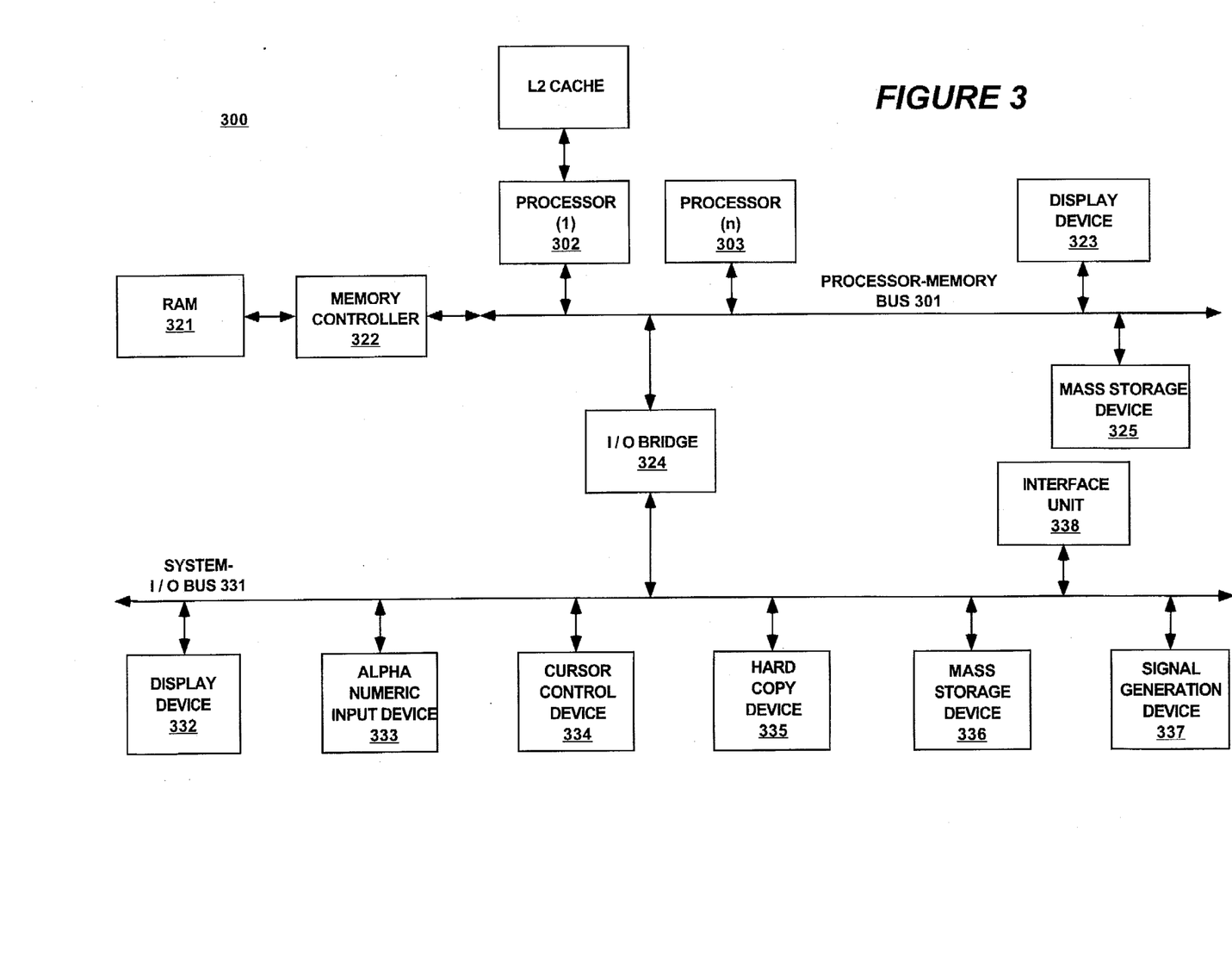
FIG. 3 shows an overview of a computer system which can be used in a conferencing environment according to one embodiment of the present invention.

FIG. 3 shows an overview of a computer system which can be used in a conferencing environment according to one embodiment of the present invention. In one embodiment, end points 110 and 120 of FIG. 1 are each a computer system 300 of FIG. 3. In another embodiment, each of the end points coupled to MCU 250 of FIG. 2 is a computer system 300 of FIG. 3.

The computer system 300 generally comprises a processor-memory bus or other communication means 301 for communicating information between one or more processors 302 and 303. Processor-memory bus 301 includes address, data and control buses and is coupled to multiple devices or agents. Processors 302 and 303 may include a small, extremely fast internal cache memory (not shown), commonly referred to as a level one (L1) cache memory for temporarily storing data and instructions on-chip. In addition, a bigger, slower level two (L2) cache memory 304 can be coupled to processor 302 or processor 303 for temporarily storing data and instructions for use by the processor. In one embodiment, processors 302 and 303 are Intel® Architecture compatible microprocessors, such as i386™, i486™, or Pentium® processors. However, the present invention may utilize any type of microprocessor, including different types of processors.

Also coupled to processor-memory bus 301 is processor 303 for processing information in conjunction with processor 302. Processor 303 may comprise a parallel processor, such as a processor similar to or the same as processor 302. Alternatively, processor 303 may comprise a co-processor, such as a digital signal processor. The processor-memory bus 301 provides system access to the memory and input/output (I/O) subsystems. A memory controller 322 is coupled with processor-memory bus 301 for controlling access to a random access memory (RAM) or other dynamic storage device 321 (commonly referred to as a main memory) for storing information and instructions for processor 302 and processor 303. A mass data storage device 325, such as a magnetic disk and disk drive, for storing information and instructions, and a display device 323, such as a cathode ray tube (CRT), liquid crystal display (LCD), etc., for displaying information to the computer user are coupled to processor-memory bus 301.

An input/output (I/O) bridge 324 is coupled to processor-memory bus 301 and system I/O bus 331 to provide a communication path or gateway for devices on either processor-memory bus 301 or I/O bus 331 to access or transfer data between devices on the other bus. Essentially, bridge 324 is an interface between the system I/O bus 331 and the processor-memory bus 301.

System I/O bus 331 communicates information between peripheral devices in the computer system. In one embodiment, system I/O bus 331 is a Peripheral Component Interconnect (PCI) bus. Devices that may be coupled to system I/O bus 331 include a display device 332, such as a cathode ray tube, liquid crystal display, etc., an alphanumeric input device 333 including alphanumeric and other keys, etc., for communicating information and command selections to other devices in the computer system (for example, processor 302) and a cursor control device 334 for controlling cursor or pointer movement. Moreover, a hard copy device 335, such as a plotter or printer, for providing a visual representation of the computer images and a mass storage device 336, such as a magnetic disk and disk drive, for storing information and instructions, and a signal generation device 337 may also be coupled to system I/O bus 331.

In one embodiment of the present invention, signal generation device 337 includes, as an input device, a standard microphone to input audio or voice data to be processed by the computer system. The signal generation device 337 also includes an analog to digital converter to transform analog audio data to digital form which can be processed by the computer system. The signal generation device 337 also includes, as an output, a standard speaker for realizing the output audio from input signals from the computer system. Signal generation device 337 also includes well known audio processing hardware to transform digital audio data to audio signals for output to the speaker, thus creating an audible output.

In one embodiment of the present invention, signal generation device 337 also includes, as an input device, a ProShare™ conferencing video camera to input video images to be processed by the computer system. The video camera is coupled to an analog to digital converter to transfer analog video data to digital form which can be processed by the computer system.

An interface unit 338 is also coupled with system I/O bus 331. Interface unit 338 allows system 300 to communicate with other computer systems by sending and receiving the video, audio and data signals for the conference, as well as the necessary control signals based on the communication medium being used. In one embodiment, interface 338 is a conventional ISDN adapter which provides communication between the system 300 and an ISDN line. Alternatively, interface unit 338 could be a modem, a conventional network adapter such as an Ethernet LAN adapter, or any of a wide variety of other communication devices.

The display device 332 used with the computer system and the present invention may be a liquid crystal device, cathode ray tube, or other display device suitable for creating graphic images and alphanumeric characters (and ideographic character sets) recognizable to the user. The cursor control device 334 allows the computer user to dynamically signal the two dimensional movement of a visible symbol (pointer) on a display screen of the display device 332. Many implementations of the cursor control device are known in the art including a trackball, trackpad, mouse, joystick or special keys on the alphanumeric input device 333 capable of signaling movement of a given direction or manner of displacement. It is to be appreciated that the cursor also may be directed and/or activated via input from the keyboard using special keys and key sequence commands. Alternatively, the cursor may be directed and/or activated via input from a number of specially adapted cursor directing devices, including those uniquely developed for the disabled.

In one embodiment of the present invention, system 300 executes the Windows™ operating system. Windows™ allows multiple applications to execute concurrently, each in a separate display window. Windows™ also allows different documents or viewed information (e.g., textual or image data) to be displayed in different display windows. It is to be appreciated that different display windows can have different sizes, and can also be re-sized by the individual users.

Certain implementations of the present invention may include additional processors or other components. Additionally, certain implementations of the present invention may not require nor include all of the above components. For example, display device 323 or mass storage device 325 may not be coupled to processor-memory bus 301, or system 300 may contain only a single processor (e.g., only processor 302). Furthermore, the peripheral devices shown coupled to system I/O bus 331 may be coupled to processor-memory bus 301; in addition, in some implementations only a single bus may exist with the processors 302 and 303, memory controller 322, and peripheral devices 332 through 339 coupled to the single bus.

Figure 4:
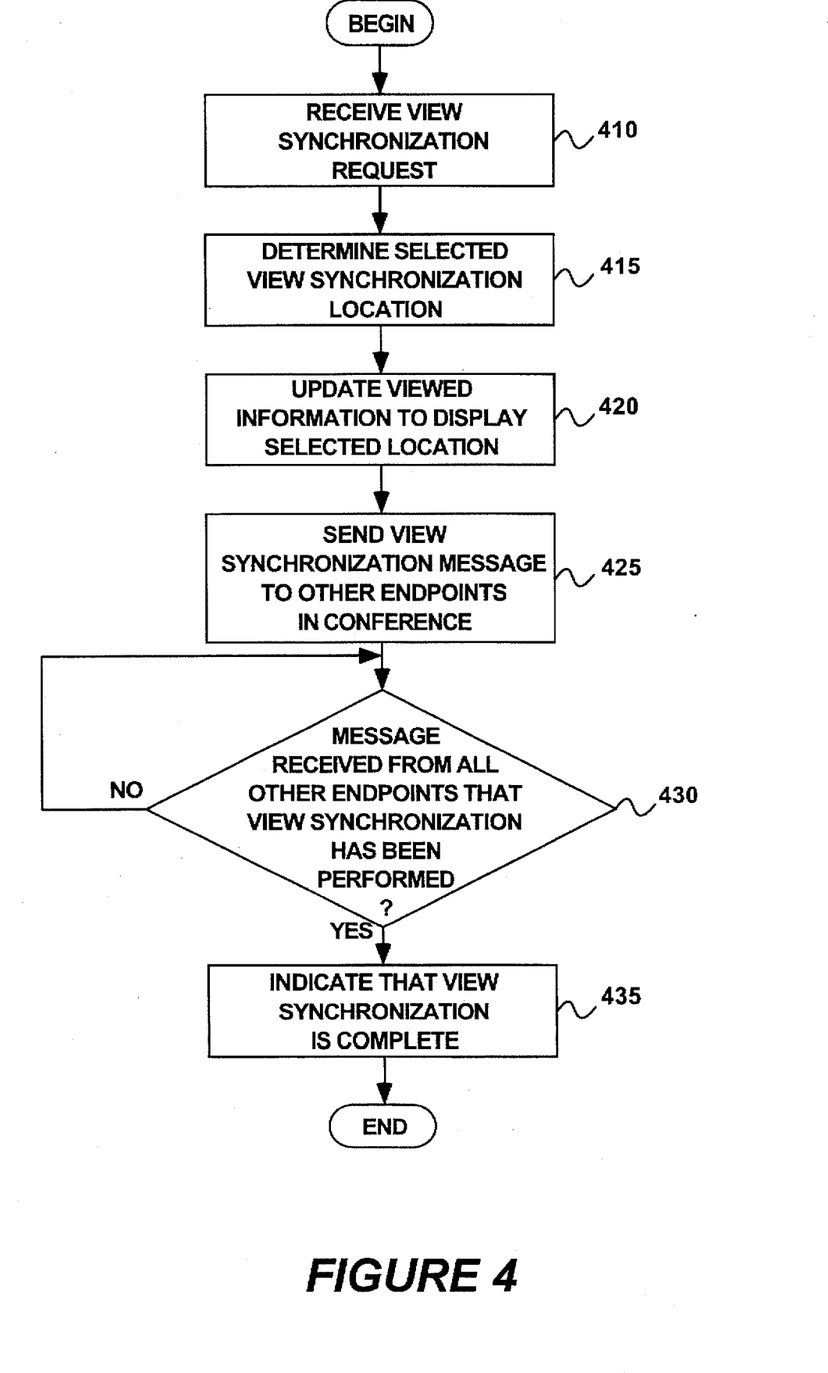
FIG. 4 is a flowchart showing the steps followed at a local endpoint in synchronizing viewed information according to one embodiment of the present invention.

FIG. 4 is a flowchart showing the steps followed at a local endpoint in synchronizing viewed information according to one embodiment of the present invention. In this discussion, the endpoint which initiates the synchronization process is referred to as the local endpoint and an endpoint which receives a message to synchronize viewed information from another endpoint is referred to as a remote endpoint. It is to be appreciated that there can be multiple remote endpoints in a conferencing system. The viewed information refers to any data which can be displayed at the endpoints, such as word processing documents, spreadsheet documents, pictures, etc.

The local endpoint first receives a view synchronization request, step 410. In one embodiment, this request is received by selection of a screen location (such as a button) or menu item in the display window of an application by a system user. It is to be appreciated that such a request can be input to the local endpoint in any of a wide variety of conventional manners.

In one embodiment of the present invention, the display of the pointer is changed by the local endpoint once the view synchronization request is received in step 410. In this embodiment, the pointer is changed to indicate to the user that the system has begun the view synchronization process. For example, the cursor may be changed to a crosshair or an X.

The local endpoint then determines the selected view synchronization location, step 415. In one embodiment of the present invention, the view synchronization location is determined by an input from the system user. In this embodiment, the system user, after selecting the view synchronization request in step 410, selects the location to which the viewed information is to be synchronized. The present invention, in step 415, determines both the page number and the position on that page based on the pointer location when the selection is made. This page number and position (also referred to as a center point) are then used for the view synchronization process, as discussed below.

In one embodiment of the present invention, each document is divided into pages. A page is a block of contiguous information having a predetermined size, such as a block of information in a word processing document which corresponds to a single physical sheet of paper when printed. It is to be appreciated that page sizes can be different for different applications. Alternatively, other conventional mechanisms may be used with the present invention which allow an endpoint to identify a particular location within a document, such as line numbers, paragraph numbers, etc.

The endpoints maintain a record of the pages which correspond to the documents being displayed. In one implementation, each endpoint includes a distributed data manager which acts as a central data management unit for all of the applications executing at the endpoint. In one implementation an application services unit, discussed in more detail below, maintains a record of the current page being displayed for each of the applications being used in the conference which are being executed at the endpoint. Thus, by accessing this record, the present invention can readily determine the current page selected.

The present invention also determines the position in the page which is selected. In one embodiment, the view synchronization location is selected using a pointing device. The user selects a particular location for view synchronization, such as by depressing and releasing a mouse button when the pointer is over the desired location. The present invention, based on the coordinates of the selection, determines the location of that selection within the current page.

In one embodiment, the operating system of the endpoint maintains a record of each application being executed at the endpoint. This record includes a mapping of the display of the application on the display device to the physical memory locations which store the page. Thus, when a particular location of a document is selected, the present invention can readily determine, by sending a message to the operating system in a conventional manner, the location within the page which is selected.

Once the view synchronization location is determined, the local endpoint updates the viewed information to display the selected location, step 420. In one embodiment of the present invention, this updating is a centering process which centers the view synchronization location by determining an offset from the beginning of the page to the upper left-hand corner of the image being displayed when the selected location is displayed in the center of the display window. The present invention identifies a location within the page which should be in the upper left-hand corner of the display window in order for the selected view synchronization location to be in the center of the display window. The identification of this upper left-hand corner location is calculated in a conventional manner based on the selected view synchronization location and the size of the display window. Once the upper left-hand corner location is determined, an offset from the beginning of the page to the upper left-hand corner is determined in a conventional manner based on the size of the page and the position of the location within the page. The present invention then sends a message to the operating system to change the display window so that the location indicated by the offset is displayed in the upper left-hand corner of the display window. This message is sent in a conventional manner using well-known operating system messaging (e.g., Windows™ messaging).

In one embodiment of the present invention, the present invention checks to make sure the centering process does not display unnecessary blank space in step 420. For example, in one implementation the present invention checks whether the distance between the calculated offset and the view synchronization location is greater than the difference between the top of the display window and the view synchronization location. If not, then the offset is modified to be at the top of the display window to avoid displaying unnecessary blank space to the top of the display window.

It is to be appreciated that the centering discussed above in step 420 is one example of centering which can be performed by the present invention. However, it is also to be appreciated that different methods of adjusting the viewed information to display the selected view synchronization location could also be used with the present invention. For example, the image display may be adjusted so that the view synchronization location is displayed in the upper left-hand corner of the display window, at the top center of the display window, or any other location within the display window.

Once the viewed information is centered, the local endpoint then sends a message to the other endpoints in the system, step 425. This message includes a page identifier and a page location which indicate the view synchronization location (that is, the selected point from step 415).

The local endpoint then checks whether it has received a view synchronization confirmation message from the other endpoints in the conference, step 430. If not, then the local endpoint continues to check, step 430. It is to be appreciated that the local endpoint can continue processing other tasks and instructions while waiting to receive the confirmation message(s). Once a view synchronization confirmation message has been received from each of the other endpoints in the conference, the local endpoint provides an indication that the view synchronization is complete, step 435.

In an alternate embodiment of the present invention, steps 430 and 435 are not performed by the local endpoint. In this embodiment, the view synchronization process is complete at step 425; the local endpoint does not provide an indication to the user that the view synchronization has been completed.

In another alternate embodiment of the present invention the centering step 420 is optional. In this alternate embodiment, no adjustment of the viewed information is made at the local endpoint. For example, the selected location may already be displayed by the local endpoint when the view synchronization location is selected. Thus, there is no need to center the viewed information in this alternate embodiment because the desired location is already being displayed.

In another alternate embodiment, the present invention includes a counter, timer, or similar means (not shown) to monitor the loop at step 430 corresponding to a message not being received from all other endpoints. In this alternate embodiment, if the counter expires then the view synchronization at the local endpoint ends, bypassing step 435. In one implementation, the local endpoint provides an indication (not shown) that the view synchronization was not completed at all remote endpoints. Thus, the present invention can avoid the possibility of an infinite loop at step 430.

Figure 5:
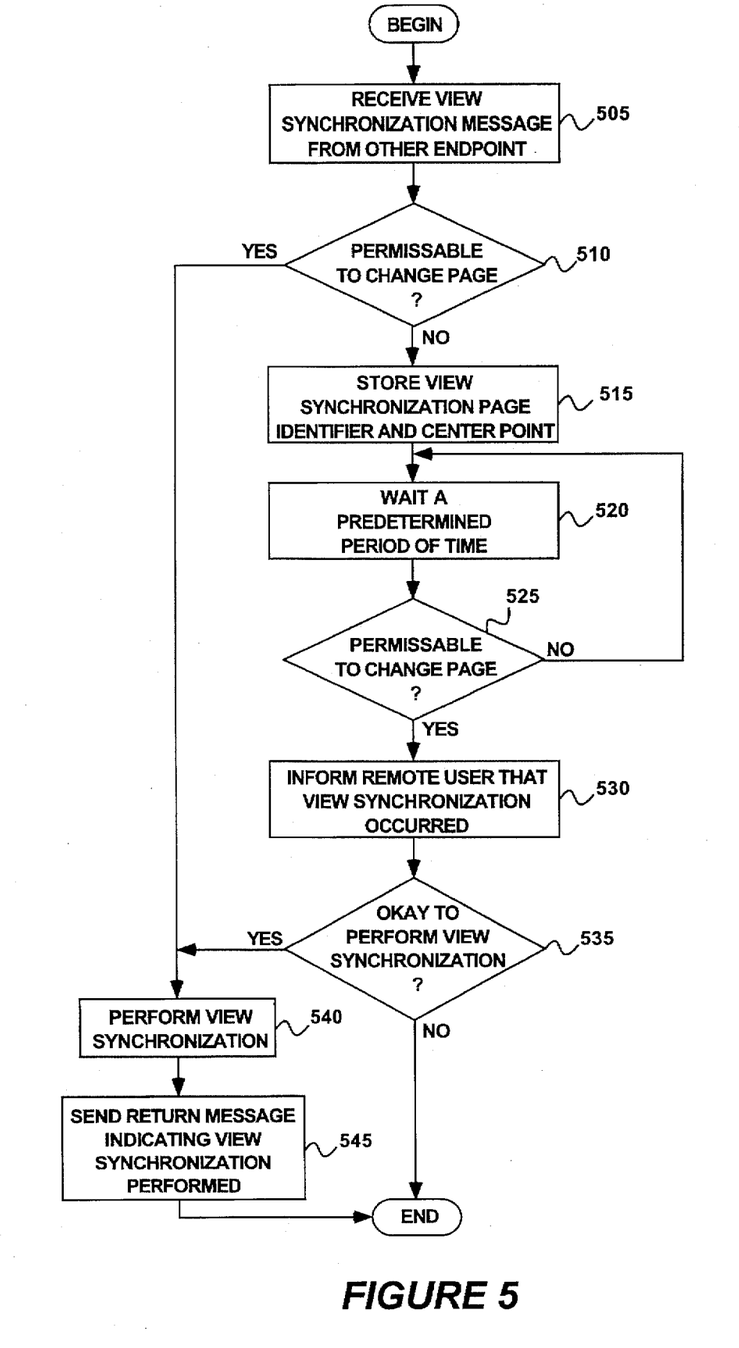
FIG. 5 is a flowchart showing the steps followed at a remote endpoint in synchronizing viewed information according to one embodiment of the present invention.

FIG. 5 is a flowchart showing the steps followed at a remote endpoint in synchronizing viewed information according to one embodiment of the present invention. In this discussion, the endpoint which initiates the synchronization process is referred to as the local endpoint and an endpoint which receives a message to synchronize from the local endpoint is referred to as a remote endpoint.

The remote endpoint first receives a view synchronization message from the local endpoint, step 505. In one embodiment, the view synchronization message includes a page identifier and a center point which identify the location in the document to which the view is to be synchronized. In one implementation, the view synchronization message also includes a document or application identifier which indicates the document or application for which the view synchronization occurred.

Upon receipt of the view synchronization message, the remote endpoint checks whether it is permissible to change the page, step 510. In one embodiment of the present invention, several circumstances may exist under which the remote endpoint is performing another task and it is thus not permissible to change the page. For example, when the view synchronization message is received, the user of the remote system may be typing in textual data to the document, inputting a drawing, selecting text, importing text or a drawing, etc. It would be very confusing to the user to all of a sudden change the page being viewed by the user while he or she is editing the document, and may, depending on the commands and the timing involved, result in system errors.

If it is permissible to change the page, then the remote system proceeds to perform the view synchronization, step 540. However, if it is not permissible to change the page, then the page identifier and center point provided in the view synchronization message are temporarily stored, step 515. The remote system then waits a predetermined period of time, step 520. In one implementation, this predetermined period of time is 50 milliseconds.

The remote system then checks whether it is permissible to change the page, step 525. This checking in step 525 is analogous to the checking discussed above in step 510. If it is not permissible to change the page, then the remote system returns to step 520 to wait a predetermined period of time before again checking whether it is permissible to change the page.

Once it is permissible to change the page in step 525, the remote system informs the user of the remote system that a view synchronization has occurred, step 530. The remote system then checks whether it is okay to perform the view synchronization, step 535. In one embodiment, the checking of step 535 is performed by providing a dialog box to the remote user asking whether it is okay to perform the view synchronization.

If it is not okay to perform the view synchronization, then the view synchronization for this remote endpoint is canceled. In one implementation, the remote system returns a message (not shown) to the local endpoint indicates the view synchronization was not performed.

However, if it is okay to perform the view synchronization, the remote system performs the view synchronization, step 540. The view synchronization is performed by updating the viewed information to display the location identified by the view synchronization message.

In one embodiment, the view synchronization message received by the remote endpoint includes a page identifier and a center point. The present invention sends a message to the data manager to retrieve the indicated page (assuming that page is not currently being displayed by the remote endpoint). The present invention makes this retrieved page the current page. The present invention then sends a message to the operating system to change the display of the document to display, at the center of the display window, the identified location of the identified page. This centering is done in the same manner as discussed above with reference to step 420.

The remote system then sends a message to the local system indicating that the view synchronization has been performed, step 545.

In an alternate embodiment of the present invention, the remote system does not check whether it is okay to perform the view synchronization in step 535. In this embodiment, the remote system performs the view synchronization in step 540 as soon as it is permissible to change the page in step 525. Informing the user of the remote system that a view synchronization occurred in step 530 is optional.

In another alternate embodiment of the present invention, the remote system does not send a return message to the local system indicating that the view synchronization has been performed in step 545.

In another alternate embodiment, the present invention includes a counter, timer or similar means (not shown) to monitor the loop between steps 520 and 525. In this alternate embodiment, if the counter expires then the view synchronization for this remote endpoint is canceled. Thus, the present invention can avoid the possibility of an infinite loop between steps 520 and 525.

In one embodiment of the present invention, an application can have different types of pages linked together. For example, a particular document may include both public and private pages which are linked together. The public pages are those parts of the document which are available for all other users of the conference to view, whereas the private pages are those which are displayed only to the user of that conference endpoint. In this embodiment, when the view of the document is synchronized, the public pages are synchronized to the identified location, along with the private pages of each individual.

It should be noted that the methods shown above in FIGS. 4 and 5 synchronize the viewed information without regard for the screen resolution or window size of either the local or remote endpoints. That is, the view synchronization method uses the page identifier and center point to identify the location to which the information is to be synchronized. The page identifier is independent of the resolution of the display at the endpoint and the size of the window in which the information is being displayed, and the centering process, as discussed above, displays the center point based on the size of the display window.

Figure 6:
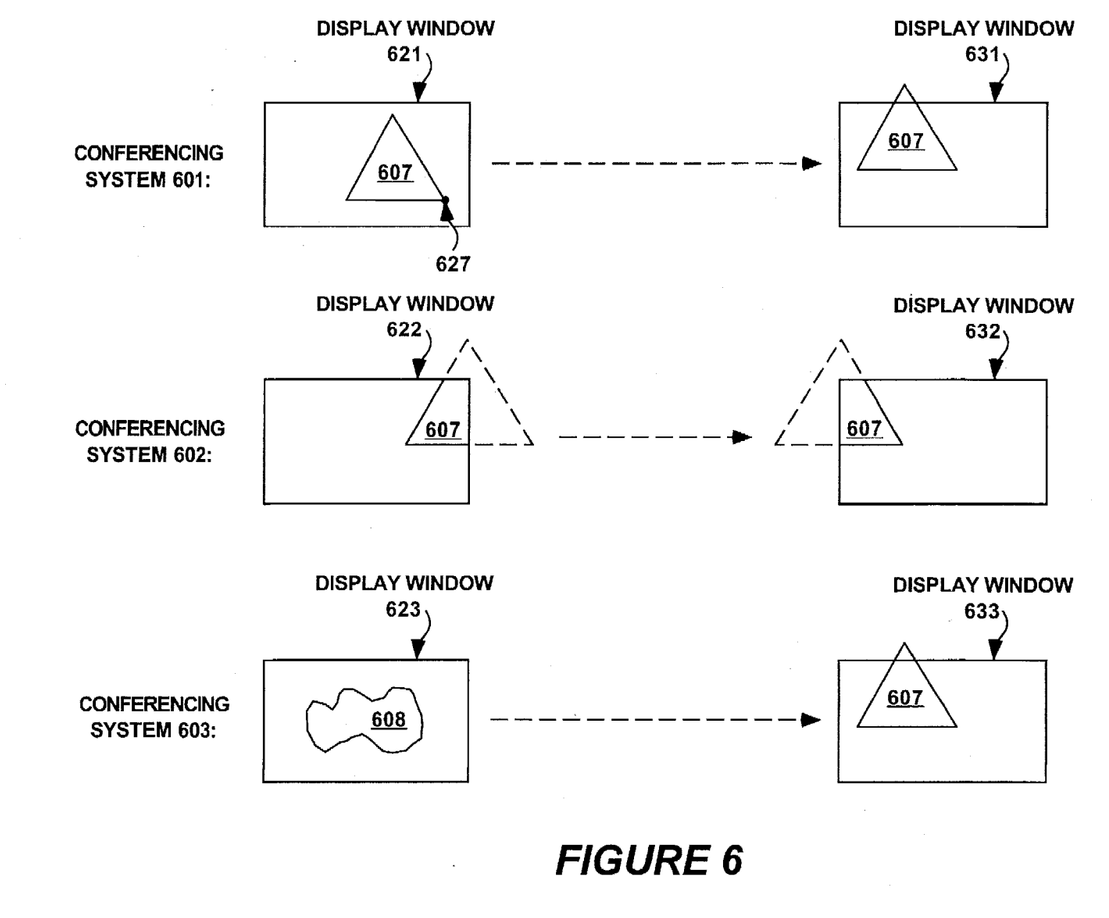
FIG. 6 is a diagram showing multiple conferencing system display windows which show the affect of the view synchronization according to one embodiment of the present invention.

FIG. 6 is a diagram showing multiple conferencing system display windows which show the affect of the view synchronization according to one embodiment of the present invention. In the example of FIG. 6, assume that the conferencing system 601 is a local system where the view synchronization selection is made and conferencing systems 602 and 603 are both remote conferencing systems. Before the view synchronization process occurs, a display window 621 of conferencing system 601 displays a FIG. 607, a display window 622 of conferencing system 602 displays a portion of the FIG. 607, and a display window 623 of conferencing system 603 displays a FIG. 608. The display window 622 may display the FIG. 607 larger than display window 621 for any of a wide variety of reasons, such as a different display resolution or a zoom option in affect. The location 627 is then selected as the view synchronization location.

The display windows 631, 632 and 633 show displays after the view synchronization process for conferencing systems 601, 602 and 603, respectively. As shown, each of the three conferencing systems is now synchronized so that the selected view synchronization location is in the center of the display window of each conferencing system.

Figure 7:
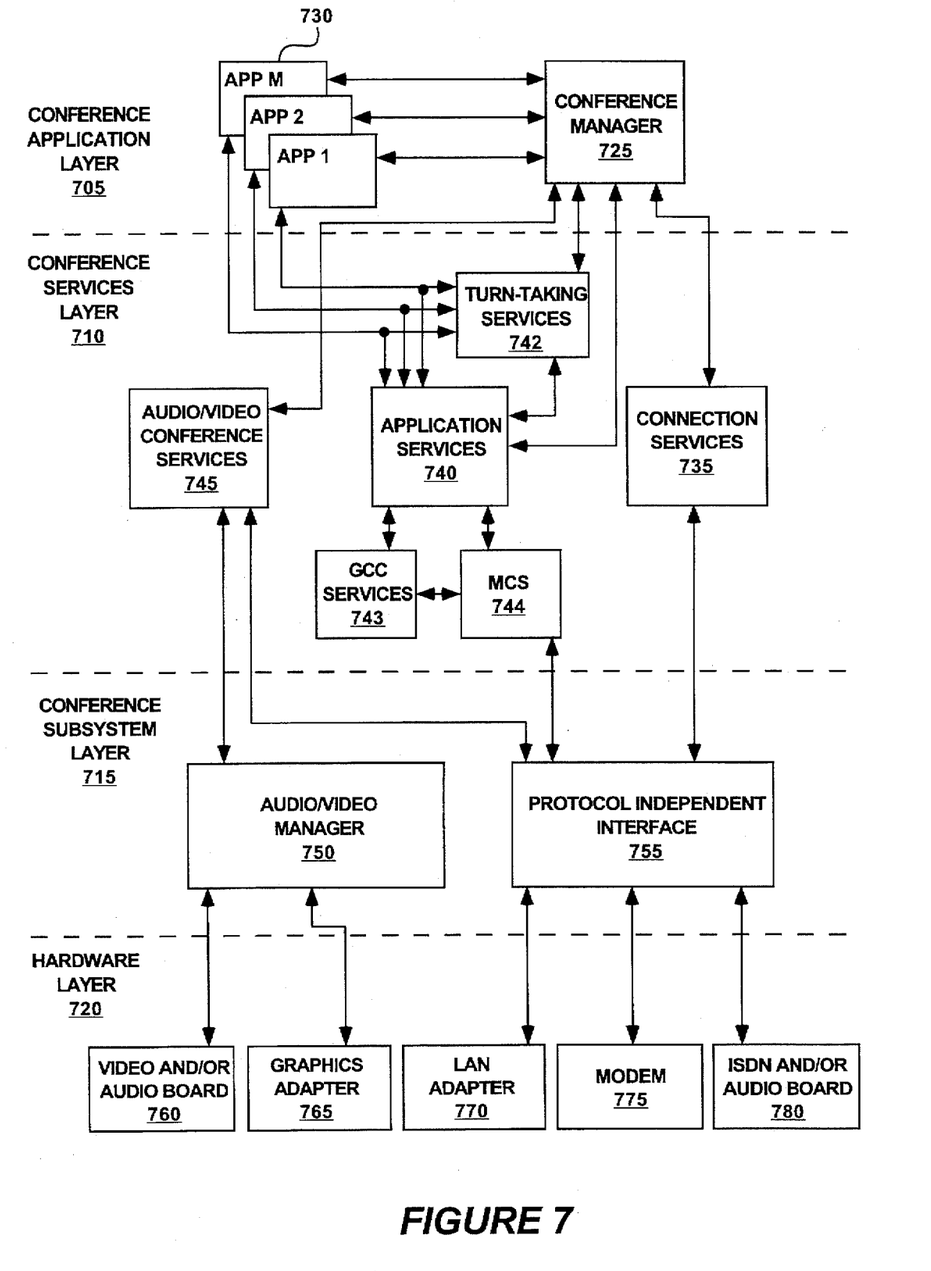
FIG. 7 is a block diagram showing an architectural overview of conferencing on an end point according to one embodiment of the present invention.

FIG. 7 is a block diagram showing an architectural overview of conferencing on an end point according to one embodiment of the present invention. As shown in FIG. 7, the conferencing architecture is separated into multiple layers. These layers are conference application layer 705, conference service layer 710, conference subsystem layer 715, and hardware layer 720.

Conference application layer 705 includes conference manager 725 and multiple applications 730. Conference manager 725 provides a conferencing interface to the user of the end point. In one embodiment, the conferencing interface is a graphical user interface (GUI). In one implementation, conference manager 725 includes options, such as through a menu, which allows the end point user to add or delete applications to the conference.

Applications 730 are M applications which represent any of a wide variety of conventional software applications. In one embodiment of the present invention, one of the applications 730 is a notebook application which is provided by the ProShare™ conferencing system. The notebook application allows the end point users to input text and/or drawings for the conference. In one implementation, additional applications are, for example, application sharing software, a high-quality image sharing application(s), or a file transfer application(s).

Conference application layer 705 is coupled to conference service layer 710. Conference service layer 710 includes connection services 735, application services 740, turn-taking services 742, generic conference control (GCC) services 743, multipoint communication services (MCS) 744, and audio/video conference services 745. Connection services 735 establishes and maintains connections with the other end point(s), via the MCU if necessary. Connection services 735 interfaces between the conference subsystem layer 715 and conference manager 725 when establishing connections which are initiated by either this end point or another end point. In one embodiment, connection services 735 also includes address book services which provide services related to managing connection addresses for conference participants.

Application services 740 provides an interface between applications 730 and conference manager 725, and conference subsystem layer 715. Application services 740 also provides an interface between applications 730 and conference manager 725, and GCC services 743 and MCS 744. In one implementation, application services 740 also prevents one application from unfairly dominating the communication services of lower layers.

Turn-taking services 742 provides an interface between applications 730 and conference manager 725, and application services 740. Turn-taking services 742 provides a library of procedure calls to support turn-taking control. Turn-taking control is a protocol which identifies when and under what circumstances a particular individual is able to input conference data to the conference.

GCC services 743 maintains a record of the applications 730 which are executing on the end point and provides registry services to allow applications 730 to register with GCC services 743.

MCS 744 provides support for full-duplex multipoint communication among an arbitrary number of connected application entities over a variety of conventional networks. In one implementation, MCS 744 provides multipoint message routing and message broadcasting. The multipoint message routing ensures that the other end points all receive messages from this system in the same order, and identifies the shortest path to each of the other end points. Message broadcasting allows connection information to be broadcast to all end points in the conference.

Audio/Video conferencing services 745 provides an interface between conference subsystem layer 715 and conference manager 725. Audio/Video services 745 provide audio and video services to conference application layer 705, such as capture and playback services for video streams.

Conference subsystem layer 715 operates in a conventional manner to provide an interface between the protocol-independent conference service layer 710 and the specific protocols of the devices in hardware layer 720. Audio/video manager 750 provides an interface which receives audio and video data from audio/video conference services 745 and outputs it to the hardware layer 720 for display or audio play.

Protocol independent interface 755 provides an interface between the components of conference service layer 710 and hardware layer 720. Interface 755 receives data and messages from the components of conference service layer 710 and converts the information received to the proper format based on the hardware connected to the system.

Hardware layer 720 includes video and/or audio board 760 and graphics adapter 765. The board 760 and adapter 765 are conventional computer system boards for realizing video and/or audio outputs. For example, the video outputs may be realized on a display device and the audio outputs may be realized via a computer system speaker. The board 760 and adapter 765 also provide sampling, digitization, compression/decompression of audio signals exchanged between two end points over a full-duplex audio connection, as well as interfacing with the proper CODEC to compress and decompress the video signals.

Hardware layer 720 also includes a LAN adapter 770, modem 775, and ISDN and/or audio board 780. LAN adapter 770 is a conventional LAN adapter, such as an Ethernet adapter. Modem 775 is a conventional line for coupling the end point to a POTS line. ISDN and/or audio board 780 is a conventional ISDN line which can also include audio support.

It is to be appreciated that, depending on the conferencing environment, all of the components of hardware layer 720 may not be included. For example, LAN adapter 770 may not be included in one of the end points.

In one embodiment of the present invention the view synchronization mechanism of the present invention is provided to the endpoints by application services 740. Each of the applications 730 provides an interface (such as a button or menu option in the display window) which allows the user to select the view synchronization option for the application.

In one embodiment, both the view synchronization request discussed above with reference to FIG. 4 and the pointer coordinates are received by one of the applications 730. This request and the pointer coordinates are sent to application services 740. Application services 740 identifies the application to which the view synchronization corresponds, the page identifier and the center point. This information is combined in a message along with an identifier indicating that the message is a view synchronization message. The message is then transferred to MCS 744 which ensures that the message is properly broadcast to all other endpoints in the conference. MCS 744 transfers the message to interface 755. Interface 755 translates the message to the appropriate format and sends the message to the other endpoints via LAN adapter 770 or modem 775, depending on the connections of the conferencing system.

View synchronization messages which are received by an endpoint are received at LAN adapter 770 or modem 774, depending on the particular conferencing system. The message is forwarded to interface 755, which translates the protocol-specific message to a generic message which can be interpreted by conference services layer 710. The generic message is then forwarded to application services 740 via MCS 744. Application services 740 accesses the message identifier which indicates that the message is a view synchronization message. Application services 740 then obtains the document identifier, page identifier, and center point from the message. Application services 740 then sends, when permissible, a message to the appropriate one of applications 730 indicating how to change the view of the document in accordance with the message (for example, step 540 of FIG. 5).

In one embodiment, the present invention is implemented as a series of software routines run by the end points of the conferencing system. In one implementation these software routines are written in the C++ programming language. However, it is to be appreciated that these routines may be implemented in any of a wide variety of programming languages. Alternatively, the present invention can be implemented in discrete hardware or firmware.

In one embodiment of the present invention, the view synchronization mechanism can be individually deactivated at the endpoints. In this embodiment, application services 740 drops any view synchronization messages or requests received by the endpoint.

In alternate embodiments of the present invention, identifiers other than the page identifiers are used to indicate the view synchronization location. For example, an annotation number, footnote number, etc. may be used.

The descriptions above discuss the view synchronization location being displayed in a display window when the view synchronization location is identified. The present invention also includes embodiments where the view synchronization location is not displayed at the time the view synchronization location is selected. For example, a page number and line number may be typed in by a user to identify the view synchronization location.

Thus, the view synchronization of the present invention provides a quick, efficient mechanism for synchronizing viewed information in a conferencing environment. The endpoint where the view synchronization request originates identifies the location to which the information is to be synchronized and sends a message to all other endpoints identifying this location. Each of the other endpoints then synchronizes itself to that location by changing the viewed information, if necessary, at the endpoint to display the location.

It is to be appreciated that although some of the above descriptions discuss a data conference, the present invention is applicable to any of a wide variety of conferences which share viewed information, such as video conferences. For example, the view synchronization of the present invention can synchronize conference systems to a particular one of multiple streams of video data (e.g., each of the streams is analogous to a page described above). By way of another example, the view synchronization of the present invention can identify a particular point on which the video camera at the remote system(s) should center.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

Thus, a method and apparatus for synchronizing viewed information in a conferencing environment has been described.

What is claimed is:

1. A method of synchronizing viewed information between multiple endpoints of a conferencing environment such that a first endpoint and a second endpoint display a same location of the viewed information, the method comprising the steps of:

(a) receiving a request to synchronize the viewed information;

(b) receiving an identifier of the location to which the viewed information is to be synchronized; and (c) updating the viewed information at the first endpoint according to the identifier to display the location, the updating being responsive to the request.

2. The method of claim 1, wherein the method further comprises the step of sending a message to the second endpoint, wherein the message includes the identifier.

3. The method of claim 1, wherein the identifier includes:

a page identifier corresponding to the location; and a center point which identifies the location within a page corresponding to the page identifier.

4. The method of claim 1, wherein the method further comprises the step of sending a message to the second endpoint indicating that the first endpoint has completed synchronizing to the location.

5. A method of synchronizing viewed information between multiple endpoints in a conferencing environment, the method comprising the steps of:

(a) determining a synchronization location corresponding to the viewed information at a first endpoint;

(b) updating the viewed information at the first endpoint to display the synchronization location;

(c) sending an identifier of the synchronization location to a second endpoint; and (d) updating the viewed information at the second endpoint to display the synchronization location.

6. The method of claim 5, wherein the determining step (a) comprises the steps of:

determining a page identifier for the viewed information corresponding to the synchronization location; and determining a center point for the viewed information corresponding to the synchronization location.

7. The method of claim 5, wherein the updating step (b) comprises the step of centering the viewed information in a display window of a display device at the first endpoint.

8. The method of claim 5, further comprising the steps of:

(e) sending the message to a third endpoint; and (f) updating the viewed information at the third endpoint to display the synchronization location.

9. An apparatus for synchronizing viewed information between a first endpoint and a second endpoint, wherein the apparatus comprises:

a memory device;

an interface unit to couple the apparatus to a conferencing environment; and a processing unit to receive a request to synchronize the viewed information and to determine an identifier of a location of the viewed information corresponding to the request, wherein the processing unit is also to update the viewed information at the first endpoint to display the location responsive to the request.

10. The apparatus of claim 9, wherein the processing unit is also to send a message to the second endpoint via the interface unit, wherein the message includes the identifier of the location of the viewed information.

11. An apparatus for synchronizing viewed information between a first endpoint and a second endpoint of a conference such that the first endpoint and the second endpoint display a same location, wherein the apparatus comprises:

means for receiving a request to synchronize the viewed information;

means for receiving an identifier of the location to which the viewed information is to be synchronized; and means for updating the viewed information at the first endpoint according to the identifier to display the location, the updating being responsive to the request.

12. The apparatus of claim 11, wherein the apparatus further comprises means for sending a message to the second endpoint, wherein the message includes the identifier.

13. The apparatus of claim 11, wherein the apparatus further comprises means for sending a message to the second endpoint indicating that the first endpoint has completed synchronizing to the location.

14. A computer-readable medium having stored thereon a plurality of instructions for synchronizing viewed information between multiple endpoints of a conferencing environment such that a first endpoint and a second endpoint display a same location of the viewed information, the plurality of instructions designed to be executed by a processor, for implementing a function to:

receive a request to synchronize the viewed information;

receive an identifier of the location to which the viewed information is to be synchronized; and update the viewed information at the first endpoint according to the identifier to display the location, the update being responsive to the request.

15. The computer-readable medium of claim 14, the plurality of instructions including instructions for implementing a function to send a message to the second endpoint, wherein the message includes the identifier.

16. The computer-readable medium of claim 15, wherein the identifier includes:

a page identifier corresponding to the location; and a center point which identifies the location within a page corresponding to the page identifier.

17. The computer-readable medium of claim 14, the plurality of instructions including instructions for implementing a function to send a message to the second endpoint indicating that the first endpoint has completed synchronizing to the location.

* * * * *